United States Patent [19]
Dere et al.

[11] 3,967,212
[45] June 29, 1976

[54] FLASH LAMP PUMPED DYE LASER

[75] Inventors: Daniel J. Dere, Palo Alto; Richard W. Wallace, Los Altos, both of Calif.

[73] Assignee: Chromatix, Inc., Mountain View, Calif.

[22] Filed: Aug. 19, 1974

[21] Appl. No.: 498,572

[52] U.S. Cl............... 331/94.5 P; 331/94.5 C; 331/94.5 L; 330/4.3; 350/166; 356/192
[51] Int. Cl.$^2$............ H01S 3/093; H01S 3/10; H01S 3/02
[58] Field of Search............ 331/94.5; 330/4.3; 350/166; 356/191

[56] References Cited
UNITED STATES PATENTS

| | | | |
|---|---|---|---|
| 3,293,564 | 12/1966 | Fan................. | 331/94.5 P |
| 3,356,966 | 12/1967 | Miller............... | 331/94.5 P |
| 3,361,989 | 1/1968 | Sirons.............. | 331/94.5 P |
| 3,447,873 | 6/1969 | Ashley et al........ | 350/166 X |
| 3,697,889 | 10/1972 | Dewey, Jr........... | 331/94.5 C |
| 3,860,888 | 1/1975 | Stephens............ | 331/94.5 C |

FOREIGN PATENTS OR APPLICATIONS 673,401  12/1965  Belgium................ 331/94.5 F OTHER PUBLICATIONS
Stephens, et al., Laser Focus, July, 1972, pp. 38–40.

Primary Examiner—Robert J. Webster
Attorney, Agent, or Firm—Flehr, Hohbach, Test, Albritton & Herbert

[57] ABSTRACT

An optical cavity for a flash lamp pumped dye laser including a pumping cavity, a birefringent filter and a plurality of frequency doubling crystals. Within the pumping cavity the flash lamp is cooled by forced air convection and operated with a D.C. simmer current. Simultaneously, the dye carrying conduit within the pumping cavity is cooled with water. The operating life of the dye is increased by using selectable filters to remove the ultraviolet radiation eminating from the flash lamp before it falls on the dye. The construction of the pumping cavity permits changing the flash lamp and the dye conduit without disturbing the optical path of the laser.

3 Claims, 4 Drawing Figures

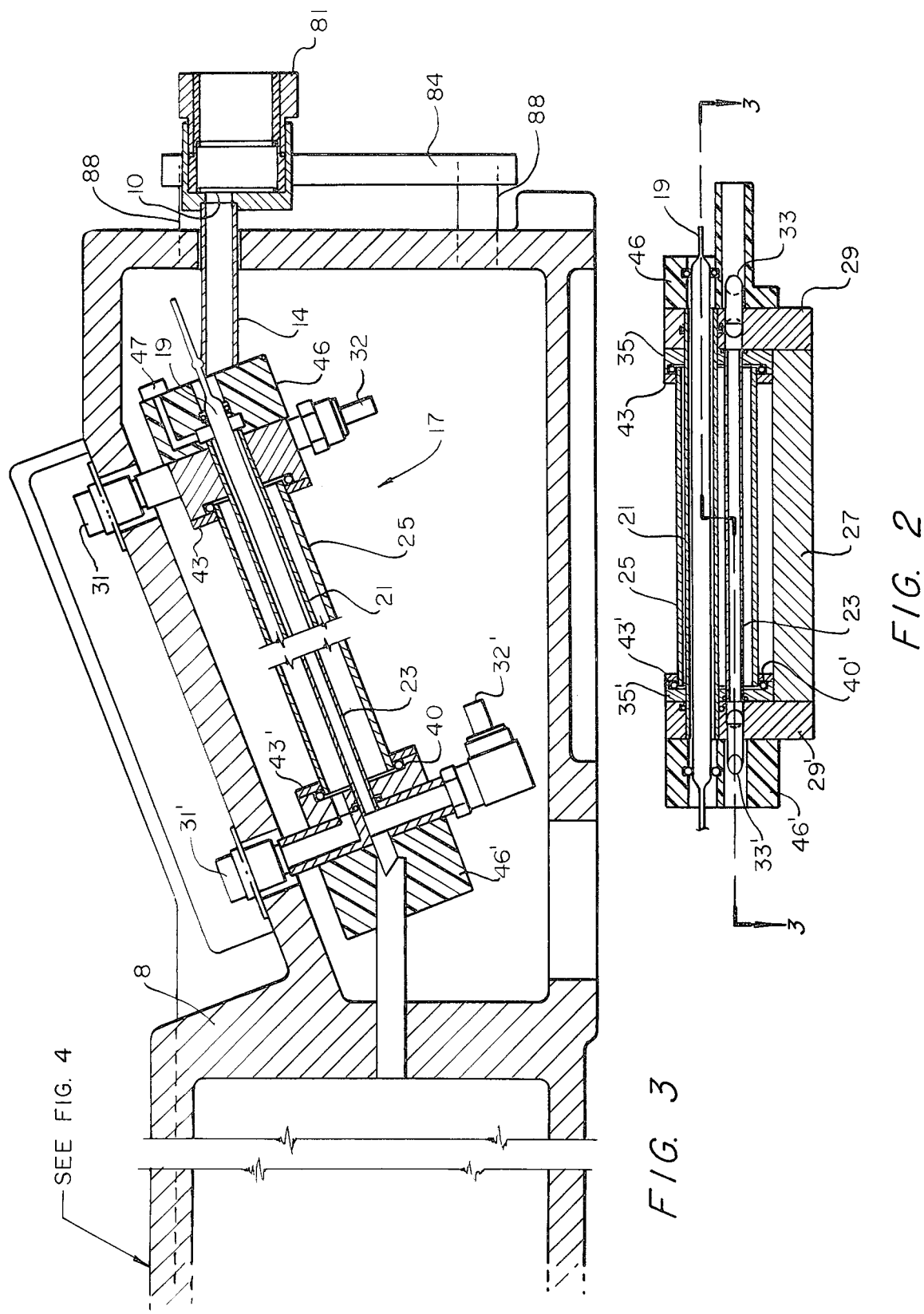

FLASH LAMP PUMPED DYE LASER

BACKGROUND OF THE INVENTION

1. Field of the Invention

This invention generally relates to improvements in laser optical systems and, more particularly, to improvements to the optical cavities of flash lamp pumped dye lasers.

2. Description of the Prior Art

The flash lamp pumped dye laser is a type of laser capable of tunable emission throughout most of the visible electromagnetic spectrum. A dye laser consists of a lasing medium, a means of exciting or optically pumping the medium and an optical cavity. The lasing medium can be any one of a plurality of fluorescent organic dyes such as rhodamine 6G or Na-fluorescein. The exitation source can be either another laser or a broad band flash lamp. The optical cavity consists of two opposed mirrors that continuously reflect the radiation emitted by the lasing medium back into itself. The two mirrors retain the radiation within the optical cavity so that the energy from the lasing medium can accumulate.

The process of lasing occuring within the lasing medium, hereinafter referred to as the dye, begins when the molecules of dye are excited from the lowest levels of the ground singlet state $S_0$ to higher vibrational-rotational levels of a second singlet state $S_1$ by absorbing light from either a second laser or a flash lamp. Thereafter the molecular energy of the dye molecules decays nonradiatively to the lower energy levels of the excited singlet state $S_1$. Laser emission occurs during the stimulated transition from the bottom vibrational band of the excited singlet state $S_1$ to one of the lower energy levels in the ground singlet state $S_0$.

A general description of dye lasers and fluorescent organic dyes is given in the article entitled "Flash Lamp-Excited Organic Dye Lasers" by Mr. B. Snavely, in the proceedings of the IEEE, Volume 57, No. 8, August 1969 at page 1374.

In the past flash lamps used in dye lasers have had short operating lifetimes and required frequent replacement. Usually these flash lamps were cooled with water and exploded in the first minutes of operation under the shock of high power pumping. Also, these flash lamps often developed cracks in their glass envelopes and became unusable after a short period of service. In addition, the glass envelopes often became discolored and opaque from electrode sputter and the output from the flash lamps rapidly degraded.

A further problem experienced with dye lasers has been the short operating lifetime of the fluorescent dyes. When organic dye molecules are pumped in an optical cavity using a broad band flash lamp, the radiation emitted from the flash lamp is in the infrared, visible and ultraviolet portions of the electromagnetic spectrum. The ultraviolet radiation has high energy and, heretofore, was very destructive to the dye molecules. Exposure to ultraviolet light changes the chemical structure of the molecules through the process of photolization and the molecules thereafter no longer fluoresce. This destruction of the dye required that dye be periodically replaced.

In addition, the conventional flash lamp operates with a very high black body temperature and produces a significant amount of infrared radiation. This infrared radiation was, heretofore, absorbed as heat by the dye and caused thermal distortion in the optical path through the pumping cavity. The heat resulted in changes in the refractive index of the dye solution and produced a poor quality output beam.

These problems are further described in an article entitled "Study of a One Watt Repetitive Dye Laser" by Mr. C. Loth and Mr. Y. Meyer, in *Applied Optics*, Volume 12, No. 1, January 1973 at page 123.

SUMMARY OF THE INVENTION

The primary object of the present invention is to provide a novel apparatus that overcomes the limitations and disadvantages of the prior art.

A further object of the present invention is to increase the operating lifetime of the flash lamp. In the present invention the flash lamp is cooled by forced gaseous convection instead of water. Cooling by gaseous convection permits the lamp to operate at a higher steady state temperature than with water cooling. The higher steady state temperature reduces the temperature gradient across the wall of the envelope and thereby reduces the devitrification and stress cracking of the envelope. In addition, the operating lifetime of the flash lamp is increased by applying a direct current arc or simmer current to the flash lamp. This simmer current reduces the physical shock subjected to the flash lamp by the high energy pumping pulses. The simmer current also reduces devitrification of the envelope and minimizes electrode sputtering and evaporation.

An additional object is to increase the operational lifetime of the fluorescent dye. The present invention contemplates increasing the operational lifetime of the fluorescent dye by preventing as much of the ultraviolet radiation as possible from falling on the dye. In the present invention various ultraviolet filtering materials are placed between the flash lamp and the dye.

A further object is to minimize the thermal distortion of the optical path in the pumping cavity. In the present invention various filtering media are used to remove the infrared radiation generated by the flash lamp before it reaches the dye. These filtering media include optical coatings on the dye tube and the air conduit as well as infrared filters located between the flash lamp and the dye tube. In addition, the pumping cavity is cooled by a liquid material in order to remove the heat produced by the flash lamp. The liquid material as well as various infrared absorbing solutions such as copper sulfate can be used to filter out the infrared radiation.

An additional object of the present invention is to provide a tuning element within the optical cavity that is insensitive to angular variation in the optical path length. This angular variation in path length arises from thermal distortion of the optical path and broadens the angular spread of the laser radiation emerging from the apparatus. In the present invention a birefringent filter is provided within the optical cavity.

Another object of the present invention is to provide a laser pumping cavity that can be disassembled without requiring realignment of the optical path. In the present invention means are provided such that the flash lamp and the dye tube can be removed and replaced without disturbing the other optical components in the system.

To achieve the foregoing objects, the present invention includes a flash lamp in the pumping cavity that is enclosed by a tubular shell gas conduit and cooled by forced gaseous convection. The flash lamp is also maintained in a standby mode between flashes through the application of a direct current arc of simmer current across the electrodes of the lamp. The dye tube in the pumping cavity is cooled by the forced circulation of a liquid material. The liquid material is in thermal communication with both the gas conduit and the dye tube and also filters out the infrared radiation emitted by the flash lamp. The present invention also includes a pumping cavity with a removably mounted flash lamp and dye tube. The removable mounting for the flash lamp and the dye tube allows these components to be easily changed without disturbing the optical alignment of the apparatus. This removable mounting permits the operator to use a plurality of dye tubes and gas conduits each having differing ultraviolet filtering properties. Thus, different filtering media can be placed between the flash lamp and the dye when pumping different dyes. Further, the present invention uses a birefringent filter within the optical cavity in order to frequency tune the laser and to minimize the sensitivity of the system to angular variations in the path length.

Additional objects and features of the invention will appear from the following description in which the preferred embodiment has been set forth in detail in conjunction with the accompanying drawings.

BRIEF DESCRIPTION OF THE DRAWINGS

FIG. 2 is a side elevational view in section of the laser pumping cavity of FIG. 1;

FIG. 3 is a plan view in section of one portion of a flash lamp pumped dye laser including the pumping cavity of FIG. 2 taken in section along line 3—3 of FIG. 2.

DESCRIPTION OF THE PREFERRED EMBODIMENT

Figure 1:
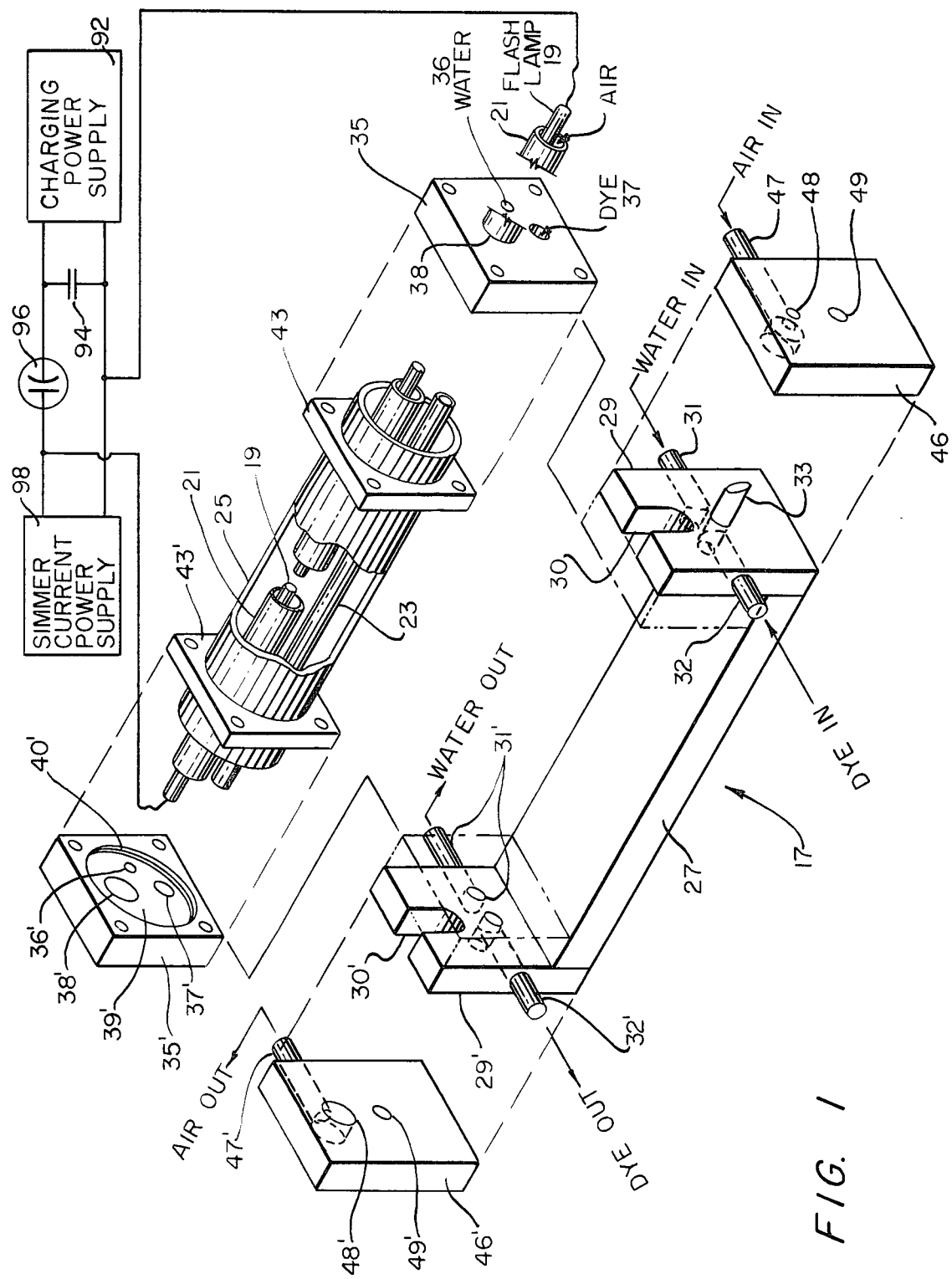
FIG. 1 is a diagrammatic, perspective view of a pumping cavity for a flash pumped dye laser according to the present invention.

Referring to FIG. 2 and FIG. 3, the flash lamp pumped dye laser of the present invention includes a frame 8 for supporting the components of the optical cavity and for maintaing the alignment of the optical path. Mounted on the end wall of the frame in FIG. 3 is a high reflector mirror 10 and a dust cover 14. The reflector mirror comprises a substrate and a plurality of optical coatings (not shown) on the front surface of the mirror. The substrate is a highly polished, laser quality, dielectric mirror having a radius of curvature of 10 meters. There are four optical coatings on the mirror, one in each quadrant of the surface. These coatings reflect, respectively, blue light, green light, yellow light, and red light and are sequentially rotatable into the laser beam by a knob 81. In one embodiment of the present invention that was actually constructed, the coatings reflected radiation in the following ranges: 400–500 nanometers; 480–580 nanometers; 540–660 nanometers; and 612–750 nanometers. The reflector mirror is mounted on a kinematic mounting so that it can be brought into optical alignment with the other components of the optical cavity. The kinematic mounting for the reflector mirror is physically and functionally similar to the kinematic mounting for the transmitting mirror 80 hereinafter described.

Referring to FIGS. 1, 2, and 3 the pumping cavity 17 includes a flash lamp 19, an air conduit 21, a dye tube 23, and an elliptical reflector 25. The flash lamp is a conventional xenon flash lamp that is wall stabilized and has an inside diameter of 4 millimeters. The flash lamp is connected to a charging power supply 92 that pumps the flash lamp with a capcitor 94 and triggered spark gap 96 in the conventional manner. Between pulses the flash lamp is maintained in a standby mode by a simmer current-power supply 98 that applies a direct current arc of approximately 30 milliamperes between the electrodes of the flash lamp.

The air conduit 21 is a glass cylinder surrounding the flash lamp and co-axial to it. The air conduit forms a tubular shell heat exchanger that permits a gaseous material such as air to come into thermal communication with the envelope of the flash lamp and to cool it by forced gaseous convection.

In one embodiment that was actually constructed the air conduit was fabricated from Corning 7740 Series glass.

The dye tube 23 is a small cylindrical conduit located in the pumping cavity parallel with the flash lamp 19 and spaced apart therefrom. Besides transporting the flourescent dye through the pumping cavity, the dye tube filters out the ultraviolet light emitted by the flash lamp 19. The construction of the pumping cavity 17 permits using different dye tubes having selectable filtering properties. For the dyes lasing at 5500 Angstroms or longer, a dye tube made of uranium-doped quartz, such as Corning 3320 Series glass, can be used. For dyes lasing in the region of 4700 Angstroms to 5500 Angstroms, a dye tube made of cerium-doped quartz can be used and for dyes that lase at shorter wavelengths, clear fused quartz can be used. Both the cerium-doped quartz and the uranium-doped quartz have the additional benefit of re-emitting as flourescense a portion of the ultraviolet light absorbed by these dye tubes. This flourescense acts, in turn, to pump the dye.

The flash lamp 19, the air conduit 21, and the dye tube 23 are all enclosed with an elliptical reflector 25 that focuses the light from the flash lamp onto the dye tube. The reflector is an elongate right cylinder that is elliptical in cross section. The flash lamp is located along one focus of the ellipse and the dye tube is located along the other focus. The exterior surface of the reflector is coated with aluminum in order to reflect the light from the flash lamp and focus it onto the dye tube.

The pumping cavity 17 further includes a rectangular base 27 that is rigidly attached to the frame 8 of the optical cavity. The base maintains the two fixed end walls 29 in parallel alignment. Each end wall has an upward opening slot 30 for receiving the protruding end of the air conduit 21 and the flash lamp 19. Within each fixed end wall is a water passage 31, 31' that connects the pumping cavity 17 to, respectively, either a source or a discharge of water. Also within each fixed end wall is a dye passage 32, 32' that connects the dye tube 23 with, respectively, either a source or discharge of flourescent dye. Each dye passage 32 further includes a Brewster bullet 33 that is rigidly mounted on the outward facing end of the fixed end wall 29. Each Brewster bullet is made of optical grade fused quartz. The outward extending face of the Brewster bullet is cut at Brewster's angle. The inward facing end of the Brewster bullet is cut orthogonally with respect to the axis of the bullet and forms a side wall of the dye passage. When the pumping cavity is assembled, the dye tube 23 is located in registry with each Brewster bullet.

The elliptical reflector 25 is sealed at each end by a cavity end plate 35. The reflector is received in an elliptical recess 39 in the cavity end plate and is sealed by an O-ring 40. Each cavity end plate includes a longitudinal water passage 36 that is in registry, after assembly, with the end of the water passage 31 in the fixed end wall 29. Each cavity end plate further includes both a dye tube orifice 37 that receives the end of the dye tube 23 and an air conduit orifice 38 that receives the air conduit 21 and the flash lamp 19. Both the air conduit and the flash lamp extend through the cavity end plates and are received in the upward opening slots 30 of the fixed end walls 29. The pumping cavity 17 is sealed at each end by a sliding elliptical plate 43 that compresses the O-ring 40 located in the elliptical recess of the cavity end plate.

It should be noted that an integral assembly is formed by the cavity end plates 35, the sliding elliptical plates 43, the reflector 25, the dye tube 23, the air conduit 21, and the flash lamp 19. As illustrated in FIG. 1 this subassembly is removable from the base 27 without disturbing either the Brewster bullets 33 or the attachment of the base 27 to the frame 8 of the optical cavity. Thus, the construction of this subassembly permits removal and interchange of the basic components of the pumping cavity without disturbing the optical alignment of the optical cavity.

Mounted on the outward facing end surface of each fixed end wall 29 is an outer plate 46. The outer plate includes a flash lamp orifice 48 that receives both the air conduit 21 and the flash lamp 19. The air conduit terminates within the outer plate and the annular space between the flash lamp and the air conduit is connected to an air passage 47. The air passage is, in turn, connected to either a source or a discharge of air. The outer plate also includes an orifice 49 that receives the Brewster bullets 33 rigidly mounted on the fixed end walls 29 and permits the lasing light in the optical cavity to fall on the Brewster surfaces.

Figure 4:
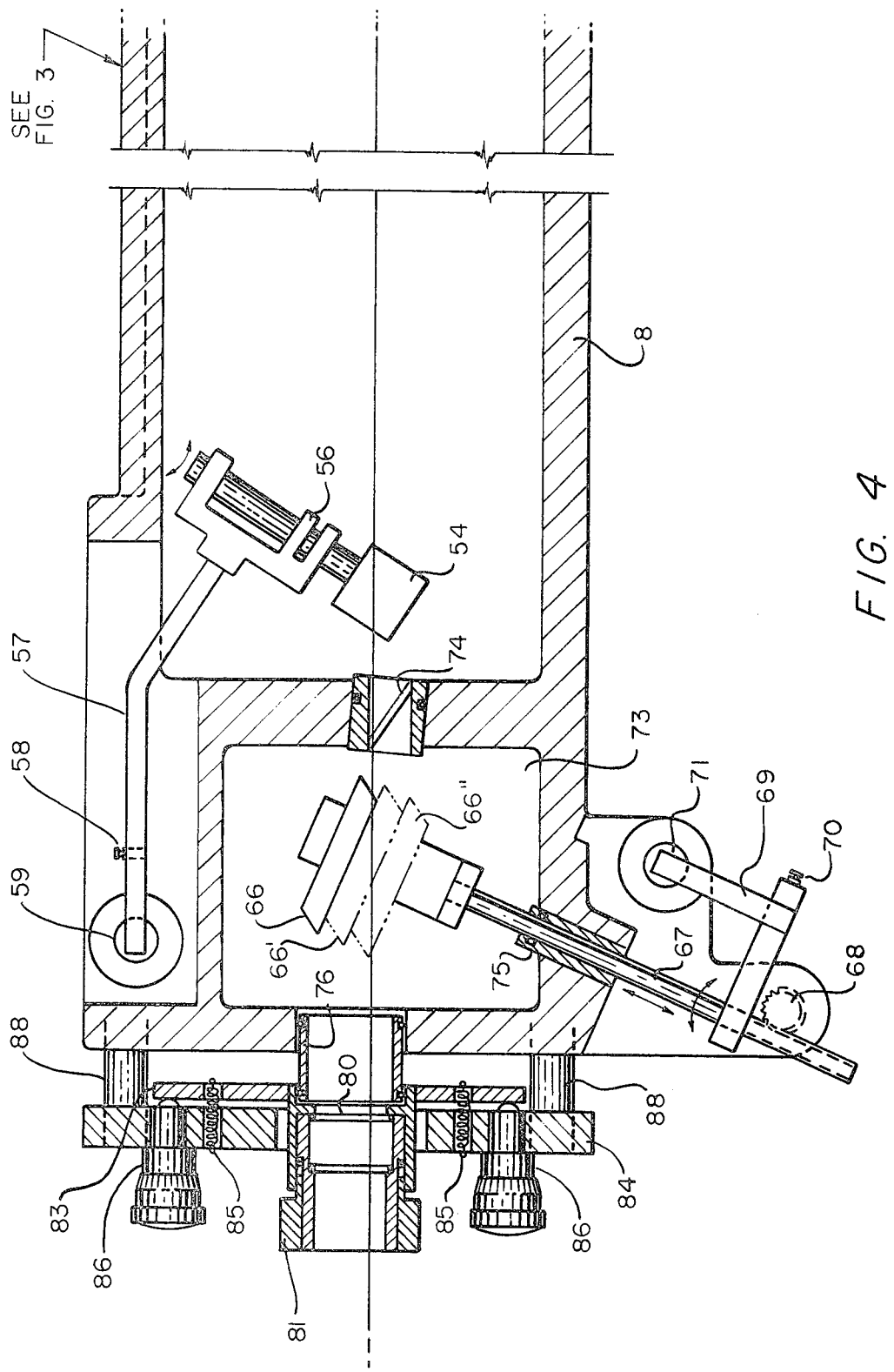
FIG. 4 is a plan view in section of the adjacent portion of the flash lamp pumped dye laser of FIG. 2.

Referring to FIG. 4, the optical cavity is tuned in frequency with a conventional birefringent filter 54. The birefringent filter includes a plurality of crystaline quartz plates that are aligned so that the lasing light in the optical cavity is incident on the filter at Brewster's angle. The birefringent filter is retained by an assembly 56 and is movably mounted so that the filter can rotate and still maintain Brewster's angle to the incident light. The assembly 56 is rotated approximately ± 15° by a rod 57 that is upwardly urged by a spring (not shown) that is attached to a spring attachment point 58. The rod is also downwardly urged by the shaft of a vernier micrometer 59 that engages the free end of the rod.

The frequency of the light in the optical cavity is doubled by using one of a plurality of non-linear crystals 66. When one of the crystals is placed in the optical path of the laser, the laser generates light having a frequency equal to the second harmonic of the fundamental frequency of the incident light. In one embodiment of the invention that was actually constructed, crystal 66 was fabricated from ammonia dihydrogenphosphate (ADP) and crystals 66', 66'' were made of potassium dihydrogenphosphate (KDP). These crystals 66, 66', 66'' were cut to have orientations off of the C-axis or optic axis of 82°, 67.5° and 53°, respectively.

The frequency doubling crystals 66 are rigidly mounted on a shaft 67 so that the crystals can be reciprocally moved with respect to the axis of the shaft and also rotated thereabout. To obtain reciprocal motion, the free end of the shaft is threaded and engages a gear 68 that is rotated by a vernier screw (not shown). To achieve rotational motion, the medial portion of the shaft is engaged by an arm 69 that is upwardly urged by a spring (not shown) attached to a spring attachment point 70. The arm is also downwardly urged by a vernier micrometer shaft 71. The vertical motion of the micrometer shaft 71 causes the shaft 67 to rotate about its longitudinal axis and thereby orient the frequency doubling crystals with respect to the optical path.

Because the frequency doubling crystals 66 absorb water, the crystals are mounted in a hermetically sealed chamber 73. The wall of the chamber between the birefringent filter 54 and the frequency doubling crystals is sealed with a conventional Brewster window 74. The shaft 67 is sealed by O-ring 75, and the end wall of the chamber is sealed with a cylindrical tube 76 that seals against the transmitting mirror 80.

The transmitting mirror 80 is an optically flat, laser quality, dielectric mirror. There are four optical coatings (not shown) deposited on the substrate of the mirror. These optical coatings correspond in design and operation to the coatings on the reflector mirror 10 and are sequentially rotatable into the optical beam by a knob 81. For operation at the laser fundamental frequencies, the dielectric coatings on the transmitting mirror transmit between 10 and 20 percent of the radiation incident thereon. For operation at the second harmonic the dielectric coatings on the transmitting mirror are highly reflective at the fundamental frequencies and are highly transmitting to the second harmonic.

The transmitting mirror 80 is retained by a movable plate 83. The movable plate engages both the cylindrical tube 76, the transmitting mirror 80 and the knob 81. The transmitting mirror is permitted to rotate with respect to the movable plate in order to bring the optical coatings on the mirror into registration with the optical beam. The movable plate is urged against a base plate 84 by a plurality of springs 85. The position of the transmitting mirror with respect to the base plate is adjusted by using the vernier screws 86. The movable plate, the base plate, springs, and the vernier screws together form a kinematic mirror mounting assembly. The base plate 84 is attached to the end wall of the frame 8 near the reflector mirror 10 by three quartz rods 88. These rods extend longitudinally along the optical cavity and insure that the base plate 84 remains aligned with respect to the other base plate onto which is mounted the reflector mirror 10.

To operate the dye laser, a flow of water through the pumping cavity 17 is first established by hooking the water passage 31 in the fixed end wall 29 to a supply of water and hooking the water passage 31' to a suitable drain. The flow of water through the pumping cavity is first through passage 31 while turning 90° and then through the water passage 36 in the cavity end plate 35. The water fills the annular space inside of the eliptical reflector 25 and outside of the dye tube 23 and the air conduit 21. The water flows out of the reflector through the water passages 36' and 31' in turn. During steady state operation the temperature of the water flowing through the pumping cavity is maintained at precisely the same temperature as the fluorescent dye in order to minimize thermal distortion of the dye.

The flow of fluorescent dye is established through the pumping cavity 17 by connecting the dye passage 32 in the fixed end wall 29 to a supply of dye and connecting the dye passage 32' to a sump. The fluorescent dye enters the pumping cavity through the dye passage 32 in the fixed end wall 29, flows past the Brewster bullet 33, turns 90°, and flows into the dye tube 23 at the interface between the cavity end plate 35 and the fixed end wall 29. The fluorescent dye next flows through the dye tube and into the passage 32', turns 90°, passes the Brewster bullet 33' and flows out of the pumping cavity. During operation the flow rate of the dye through the dye tube is maximized in order to insure turbulence within the tube.

The flow of air is established through the pumping cavity by attaching the air passage 47 on the outer plate 46 to an air pump. The flow of air enters the pumping cavity through the air passage 47 and thereafter passes into the annular space between the air conduit 21 and the flash lamp 19. The air flows through this annular space and cools the flash lamp by forced convective cooling. The air flows out of the pumping cavity through the air passage 47'.

It should be noted that the water, dye, and air all flow in the same direction through the eliptical reflector 25.

After the water, dye and air flows have been established, the elements in the optical cavity are aligned using a helium neon laser (not shown). The birefringent filter 54 and the frequency doubling crystals 66 are moved out of position. The transmitting mirror 80 is removed, and the helium neon laser is positioned at the orifice where the mirror was removed. The Brewster bullets 33 and the reflector mirror 10 are first aligned so that the helium neon laser reflects back on itself. Thereafter, the transmitting mirror 80 is replaced and adjusted so that the mirrors, the Brewster bullets, and the dye form an optical cavity.

Next, the charging power supply 92 is energized to charge up the capacitor 94. The flash lamp 19 is pulsed by the triggered spark gap 96 and produces a broadband output. The emission from the flash lamp is focused on the dye tube 23 because both the flash lamp and the dye tube are located at a focus of the eliptical reflector 25. Between pulses the flash lamp 19 is kept in a standby mode by passing a direct current arc or simmer current through the flash lamp from the simmer current power supply 98. The use of a simmer current is further disclosed in an article entitled "Simmering Lamps Live Longer" written by Mr. R. Stephens and Mr. W. Hug in "Laser Focus," July 1972, page 38.

After the fluorescent dye has commenced lasing in the dye tube 23, the birefringent filter 54 is inserted into the optical path. The filter is rotated by the vernier micrometer 59 until the fundamental wavelength of the output is brought to the desired frequency. To obtain an output at the second harmonic of the fundamental frequency, one of the frequency doubling crystals 66 is inserted into the optical path. Next, the crystal is rotated to phase match the fundamental frequency of the system to its second harmonic and thereby obtain maximum output.

During operation, the laser light within the optical cavity travels along an optical light path from the high reflector mirror 10 through the dust cover 14 and on to the Brewster bullet 33. The light then travels through the Brewster bullet and into the fluorescent dye carried in the dye tube 23. When the flash lamp 19 is pulsed, the reflector 25 focuses the radiation onto the dye tube. The laser light passes out of the pumping cavity 17 through the second Brewster bullet 33' and travels into the birefringent filter 54. The birefringent filter frequency tunes the dye laser. The light next passes in turn through the Brewster window 74, the frequency doubling crystal 66' and on to the transmitting mirror 80.

To shut down the dye laser, the charging power supply 92 to the flash lamp 19 is de-energized, and the air, water and dye flows are secured. It is contemplated that the alignment of the optical cavity will occur only once and the helium neon laser will only be used during the initial setup of the system.

In one embodiment of the present invention that was actually constructed, the dye tube 23 was four inches long and had an inside diameter of three millimeters. The fluorescent dye was pumped through the dye tube at a rate of one gallon per minute. The dielectric mirrors was placed 55 centimeters apart. The power supply included a 0.5 microfarad capacitor and inserted 15 joules per pulse into the flash lamp. The system had a maximum pulse repetition rate of 30 pulses per second.

Although air has been disclosed as the preferred gaseous cooling medium for the flash lamp, it is contemplated that any suitable gaseous material including both inorganic and organic gases can be used.

Moreover, it should be noted that although Brewster bullets 33 have been disclosed as the preferred means for providing an optical interface between the dye and the mirrors 10, 80, it is contemplated that any suitable optical end wall can be used. Such end walls can include optical lenses and windows. The term optical end wall is also intended to include reflecting and transmitting mirrors that are placed at the ends of the dye tube in contact with the dye.

Thus, although the best mode contemplated for carrying out the present invention has been herein shown and described, it will be apparent that modification and variation may be made without departing from what is regarded to be the subject matter of the invention.

We claim:

1. Apparatus for optically stimulating a dye laser with a flash lamp, comprising:
    means for rigidly supporting a pumping cavity;
    first and second optical refracting end walls co-axially mounted on the supporting means for transmitting laser light along an optical light path through the pumping cavity between said end walls;
    a flash lamp mounted on the supporting means;
    a dye tube removably mounted on the supporting means between the end walls, parallel with the flash lamp and proximate thereto for carrying liquid dye, said optical light path passing longitudinally through the dye tube;
    means for removably mounting said dye tube on the supporting means so that said dye tube can be removed or interchanged without disturbing the first and second optical end walls; and
    a reflecting pumping cavity wall for focusing the light from the flash lamp onto the dye tube.

2. Apparatus for optically stimulating a dye laser with a flash lamp, comprising:
    means for rigidly supporting a pumping cavity;
    first and second optical refracting end walls co-axially mounted on the supporting means for transmitting laser light along an optical light path through the pumping cavity between said end walls;
    a flash lamp removably mounted on the supporting means;
    means for removably mounting said flash lamp on the supporting means so that said flash lamp can be removed or interchanged without disturbing the first and second optical end walls;

a dye tube mounted on the supporting means between the end walls; parallel with the flash lamp and proximate thereto for carrying liquid dye, said optical light path passing longitudinally through the dye tube; and a reflecting pumping cavity wall for focusing the light from the flash lamp onto the dye tube.

3. The apparatus of claim 2 wherein said apparatus further includes means for removably mounting said flash lamp, said dye tube, and said cavity wall without disturbing the first and second optical end walls.

* * * * *